United States Patent

Frutschi et al.

Patent Number: 5,363,642
Date of Patent: Nov. 15, 1994

[54] METHOD OF OPERATING A GAS TURBINE GROUP

[75] Inventors: Hans U. Frutschi, Riniken; Anders Lindvall, Baden; Hans Wettstein, Fislisbach, all of Switzerland

[73] Assignee: Asea Brown Boveri Ltd., Baden, Switzerland

[21] Appl. No.: 202,688

[22] Filed: Feb. 25, 1994

Related U.S. Application Data

[63] Continuation of Ser. No. 26,402, Mar. 4, 1993, abandoned.

[30] Foreign Application Priority Data

Mar. 31, 1992 [DE] Germany ............... 4210541

[51] Int. Cl.$^5$ ................................. F02C 7/18
[52] U.S. Cl. ..................... 60/39.04; 60/39.17; 60/727
[58] Field of Search ........... 60/39.02, 39.04, 39.161, 60/39.17, 39.511, 727, 728

[56] References Cited

U.S. PATENT DOCUMENTS 2,940,257  6/1960  Eckert et al. ............... 60/39.511
3,973,396  8/1976  Kronogard ................. 60/39.511
4,249,371  2/1981  Romeyke .................... 60/727
4,522,024  6/1985  Zaugg ........................ 60/727
4,630,436  12/1986  Frutschi ..................... 60/727
4,631,913  12/1986  Kreitmeier ................. 60/727

FOREIGN PATENT DOCUMENTS

3424138A1   1/1986  Germany .
4019343A1  12/1991  Germany .
572577      2/1976  Switzerland .
2020367    11/1979  United Kingdom ......... 60/727

Primary Examiner—Louis J. Casaregola
Attorney, Agent, or Firm—Burns, Doane, Swecker & Mathis

[57] ABSTRACT

In a method of operating a gas turbine group (34) with or without integrated steam process (20) and with or without an air reservoir installation (20), a series connection with one and the same air mass flow (16, 17) is used for cooling one or more structures (15, 18, 19) which are in effective connection with the mass flow of the gas turbine group (34), the cooling air mass flow being extracted from a position which has a sufficiently low temperature.

6 Claims, 2 Drawing Sheets

METHOD OF OPERATING A GAS TURBINE GROUP

This application is a continuation, of application Ser. No. 08/026,402, filed Mar. 4, 1993, abandoned.

BACKGROUND OF THE INVENTION

1. Field of the Invention

The present invention concerns a method for operating a gas turbine group.

2. Discussion of Background

In a thermal power station installation, in particular an air reservoir installation, particular problems can appear with respect to the turbine cooling. These arise from the very high pressure ratio of about 30:1 to 70:1 necessary for compatibility with an economically tolerable compressed air reservoir. This high pressure ratio demands at least one reheat stage in the turbine expansion, again for economic reasons. There is a substantially smaller heat or temperature drop for the high-pressure turbine, referred to below as the HP turbine, than there is for the low-pressure turbine, referred to below as the LP turbine. In an air reservoir gas turbine, in which the compressor is equipped with intercooling, compressed air is delivered to a reservoir cavern by an electrical machine operating as a motor. An air/water heat exchanger cools the heated compressed air coming from the last compressor unit for the purpose of reducing its specific volume and transfers the heat into a hydraulic accumulator installation, the corresponding shut-off units being open during this so-called charging operation. If electrical energy has to be generated again from the stored compressed air, the compressor group is shut down by means of a control system. The turbine group, comprising, for example, an HP turbine, an LP turbine and the electrical machine, which now has to be operated as a generator, is started by opening the corresponding shut-off unit. This only takes place initially by means of compressed air from the reservoir, the compressed air being preheated in the heat exchanger by the stored hot water. After ignition in the combustion chamber, the production of electrical energy can be undertaken. It is, however, also possible to operate the installation as a through-connected gas turbine by a corresponding arrangement of the shut-off units and couplings. It is then simultaneously possible to store some air or to extract it from the cavern. Such an installation can no longer meet the present-day economic specifications with respect to reducing the fuel consumption and an additional consideration is that such installations are not able to satisfy the present-day maximum pollutant emission figures which have to be demonstrated. It is, indeed, correct that an exhaust heat boiler can be added to generate steam. The steam generated in this way can be supplied to the steam turbine group or be supplied directly to the gas turbine group in ways which are known. The question of whether one or the other method of using the steam is preferred depends on the operational period in turbine operation. For less than about 2–4 hours per day, steam injection will be correct. If such a thermal power station installation is now optimized, the hot gas temperatures at the HP turbine inlet corresponding to the state of the art involve such a high outlet temperature of the combustion gases from the turbine that the latter cannot be used directly as the coolant for the LP turbine. For this reason, the turbine is generally cooled with cooling air which is extracted before the cavern of the air reservoir installation, as is usual for cooling turbines. In through-connected gas turbine operation, the cooling air leading to the turbine could, of course, be extracted at a compressor position with matching pressure in order to avoid throttling losses. Whereas the consumption of cooling air for the turbine mainly reduces the turbine efficiency because of mixing losses (for a given mixed temperature at its inlet), the consumption of cooling air for the LP turbine has a very disadvantageous effect because this cooling air bypasses the HP turbine, i.e. it performs no work there.

SUMMARY OF THE INVENTION

Accordingly, one object of the invention is to provide a novel remedy for this. The invention, as characterized in the claims, is based on the object of proposing measures which, in a method of the type mentioned at the beginning, introduce an improvement to the economy and minimize the pollutant emissions and are able, in consequence, to correct the disadvantages presented above.

The essential advantage of the invention may De seen in the fact that the cooling air extracted from the high-pressure air conduit downstream of the compressor group during the discharging operation of the air reservoir installation has a temperature level of perhaps 200° C., which is substantially less than the usual cooling air temperature level of 360°–400° C. This cooling air can therefore be dispatched with a tandem effect through several assemblies subject to thermal loading, for example combustion chamber, turbine, etc. and can be used to cool them, first in a closed flow path and subsequently in an open or closed flow path. The mixing losses in the turbine, for example, are reduced in this way so that the turbine has a better efficiency.

Advantageous and expedient further developments of the solution to the object of the invention are characterized in the further claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
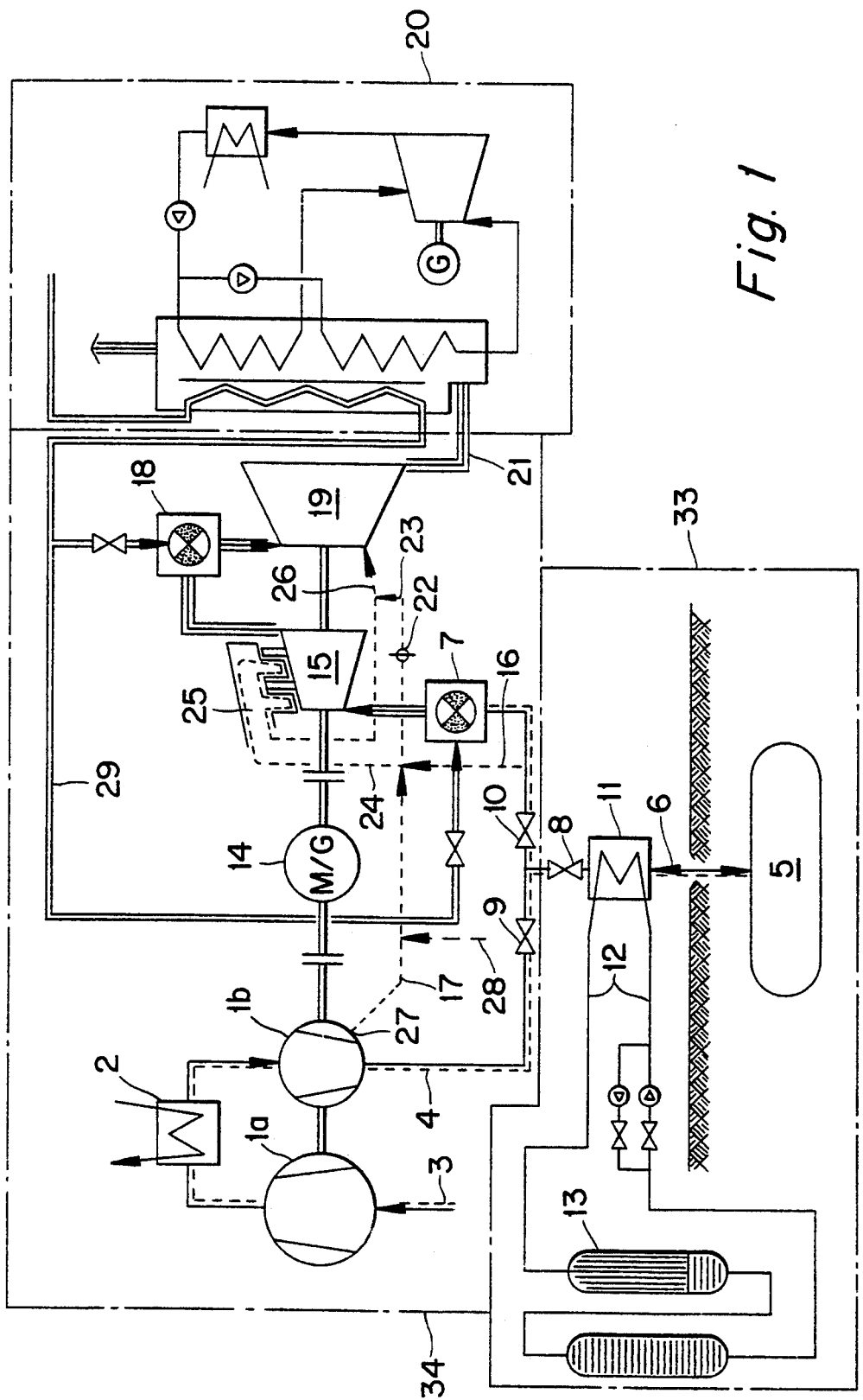
FIG. 1 shows a tandem connection of the stator of the high-pressure turbine and the stator and rotor of the low-pressure turbine and FIG. 2 shows a tandem connection on the cooling air side of the combustion chamber and turbine

Referring now to the drawings, wherein like reference numerals designate identical or corresponding parts throughout the several views, and wherein all the elements not necessary for direct understanding of the invention have been omitted and wherein the flow direction of the media is indicated by arrows, FIG. 1 shows an air reservoir gas turbine, comprising a gas turbine group 34, an air reservoir installation 33 and a steam circuit 20. A compressor group of the gas turbine group 34, comprising a first compressor 1a, a second compressor 1b and an intercooler 2 connected between them, compresses the induced air 3 and delivers it by means of a conduit 4 to a cavern 5 of the air reservoir installation 33. This delivery of the compressed air to the cavern 5 takes place by means of a further conduit 6 which branches off from the first conduit 4. The conduit 4 is simultaneously the delivery line to a first heat generator 7 of the gas turbine group 34, a series of actuators undertaking the operational connection of the conduits 4, 6 relative to one another. The conduit 6 to the cavern 5 has, firstly, an actuator 8 immediately after its branch point from the conduit 4, two further actuators 9, 10 upstream and downstream of this branch point ensuring that the respective conduit can be switched on. Delivery of the compressed air to the cavern 5 takes place with the first actuator 9 in the conduit 4 and the actuator 8 in the conduit 6 being open while the second actuator 10 in the conduit 4 remains closed. The installation is operated as a through-connected pure gas turbine group by closing the actuator 8 in the conduit 6 and simultaneously opening the two actuators 9, 10 in the conduit 4. A heat exchanger 11, which is connected to a thermal reservoir 13 by means of a conduit system 12, is effective downstream of the actuator 8 in the conduit 6 to the cavern 5. This reservoir 13 takes up the compression enthalpy of the last compressor stage 1b, the compressor being driven by the electrical machine 14 operating as a motor. The energy to be stored is therefore extracted from the electrical grid. The compression enthalpy contained in the thermal reservoir 13 is supplied again to the cold reservoir air during the discharging operation so that the work capacity of the air increases. It has been found that a further rise in the working medium temperature by means of a heat generator, operated perhaps with a gaseous fuel, causes a further significant increase in the work capacity. This is a large economic advantage because the additional investment is small compared with the gain in work. It is only this which makes it at all possible to operate an air reservoir power station profitably. It is also, however, necessary to take account of the fact that the air pressure must be set as high as possible in order to keep the costs for the cavern 5 as low as possible; pressures of between 50 and 70 bar are usual. Such a high pressure, however, favors the occurrence of $NO_x$ in the first heat generator 7 upstream of a high-pressure turbine 15 to which these hot gases are to be admitted. This is not permissible from an ecological point of view. Help can be provided here by appropriate means, such as injecting ammonia at a suitable position.

It is still, however, necessary to make provision for the cooling of the installation assemblies subjected to thermal loads. On this point, the figure shows a tandem connection of the stator 25 of the high-pressure turbine and the stator and rotor of the low-pressure turbine 19. The cooling air extracted from the air conduit 4 by means of a cooling air conduit 16 has a temperature level of approximately 200° C. during the discharging operation of the air reservoir installation 33, this temperature being substantially less than the usual cooling air temperature level of 360°–400° C. In consequence, this cooling air is first used in a closed flow path, by means of a continuation conduit 24 of the cooling air conduit 16, in the stator 25 of the high-pressure turbine 15 in order to cool this stator and is subsequently supplied, by means of a return conduit 26 of the low-pressure turbine 19, for cooling the latter. The mixing losses in the high-pressure turbine 15 are reduced in this way so that this turbine has a better efficiency. In through-connected gas turbine operation, the cooling air mentioned is advantageously extracted at a tapping position 27, with matching pressure, of the compressor 1b. If the cooling air temperature in the return conduit 26 should be too high, a remedy can be provided by mixing in colder cooling air to the extent necessary from the cooling air conduit 16 or 17 by means of a by-pass conduit 23. The corresponding metering takes place by means of a metering unit 22 which is placed in the by-pass conduit 23. However, there are heat generators 7, 18 present; these must also be cooled and therefore consume cooling air. Whereas the cooling of the heat generator 7 at the high-pressure end has no influence on the power and efficiency for a given mixed temperature at the inlet into the high-pressure turbine 15, the consumption of cooling air for the heat generator 18 at the low-pressure end causes an adverse reduction in the flow of working medium through the high-pressure turbine 15. As already mentioned, the installation can be operated as a pure gas turbine by corresponding connection of the actuators. The methods presented for reducing the $NO_x$ emissions and also for efficient cooling without impairing the efficiency have unlimited validity. In addition, the relationships presented also apply in the case where a decentralized arrangement is selected between the compressor groups 1a, 1b, 2 and the turbine groups 15, 19, the cavern-type compressed air reservoir 5 then taking on the form of a long connecting conduit for transporting energy. In order to further improve the efficiency and the output capacity of the gas turbine group, a secondary steam process 20, such as is described in EP-B1-0 150 340, for example, is preferably coupled onto the gas turbine group. This steam process utilizes, to a large extent and in known manner, the heat in the exhaust gases 21 from the low-pressure turbine 19. A different waste heat utilization, such as district heating for example, can obviously appear in the place of this steam process 20. In order to minimize energy losses, the fuel 21 necessary for supplying the heat generators 7, 18 is preheated, if possible in counterflow to the combustion gases, in a waste heat boiler of the steam process 20.

Figure 2:
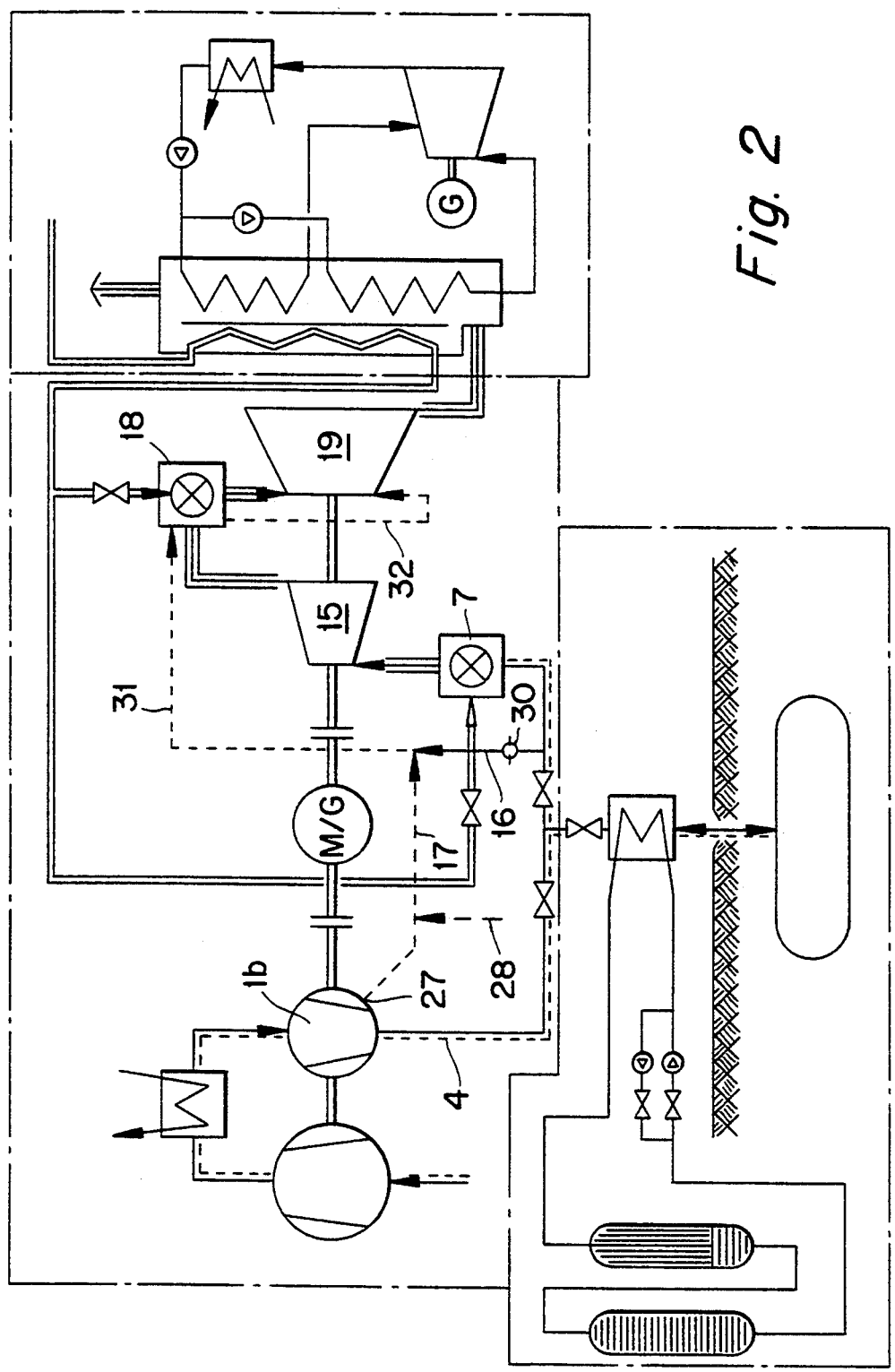

In the following description of FIG. 2, only the technical circuit differences relative to FIG. 1 are considered. This figure shows a tandem connection on the cooling air side between the heat generator 18 at the low-pressure end and the turbine 19. The relatively cold cooling air by means of a conduit 31, which is supplied by means of the air conduit 4 during the discharging operation or by means of a mixing conduit 17 connected to the compressor 1b at a matching tapping point 27 in gas turbine operation, is preheated in the heat generator 18 at the low-pressure end while fulfilling its cooling task in such a way that it can undertake, in the usual manner, the cooling of the low-pressure turbine 19 acting downstream by means of a further conduit 32 emerging from the heat generator 18. A metering unit 30, which is placed in the cooling air conduit 16 and acts on the air conduit 4 downstream of the tapping point, ensures a specified quantity control during the discharging operation. Any reduction in the air temperature in the mixing conduit 17, which may be necessary in gas turbine operation, can be achieved by injecting a quantity of water or steam 28 into this conduit.

Obviously, numerous modifications and variations of the present invention are possible in light of the above teachings. It is therefore to be understood that within the scope of the appended claims, the invention may be practised otherwise than as specifically described herein.

LIST OF DESIGNATIONS 1a, 1b Compressor
2 Intercooler
3 Induced air
4 Air conduit from the compressor
5 Cavern
6 Air conduit from and to the cavern
7 Heat generator
8, 9, 10 Actuator
11 Heat exchanger
12 Conduit system to the thermal reservoir
13 Thermal reservoir
14 Electrical machine
15 High-pressure turbine
16 Cooling air conduit
17 Cooling air conduit
18 Heat generator
19 Low-pressure turbine
20 Steam circuit
21 Exhaust gases
22 Metering unit
23 By-pass conduit
24 Cooling air conduit
25 Turbine stator
26 Return conduit
27 Tapping position on the compressor
28 Steam/water conduit
29 Fuel conduit
30 Metering unit
31, 32 Cooling air conduits
33 Air reservoir installation
34 Gas turbine group

What is claimed as new and desired to be secured by Letters Patent of the United States is:

1. A method of operating a gas turbine group, the gas turbine group comprising a high pressure and a low pressure compressor, an intercooler operating between the compressors, at least a first high pressure and a second low pressure gas turbine, the first gas turbine upstream of the second gas turbine, and at least one electrical machine, the method comprising the steps of:

operating a first heat generator upstream of the first gas turbine to generate a hot mass flow for driving the first gas turbine;

operating a further heat generator downstream of the first turbine and upstream of the second gas turbine to further heat the mass flow for driving the second gas turbine;

extracting a single stream of compressed air from the high pressure compressor upstream of its outlet;

directing the single flow of compressed air in series to at least two components of the gas turbine group through which the hot mass flow moves for cooling the components, at least a first component being cooled by providing the compressed air to the component without mixing the compressed cooling air with the hot mass flow; and, upon cooling a final component in series, admixing the compressed air in with the hot mass flow.

2. The method as claimed in claim 1, wherein the gas turbine group further comprises an air reservoir installation, wherein, during operation of the gas turbine group with the air reservoir as a source of compressed air, the method further comprising the steps of:

discharging compressed air from the air reservoir installation through a supply conduit located downstream of the high pressure compressor and upstream of the first heat generator; and, extracting air required for cooling downstream of the reservoir and directing the extracted air to the components for cooling.

3. The method as claimed in claim 2, wherein a heat exchanger acts downstream of the reservoir and wherein the air required for cooling is extracted downstream of this heat exchanger.

4. The method as claimed in claim 1, wherein a high-pressure turbine and a low-pressure turbine are cooled in series.

5. The method as claimed in claim 4, wherein the stators of the turbines are cooled in series.

6. The method as claimed in claim 1, wherein the heat generator at the low-pressure end and the low-pressure turbine are cooled in series.

* * * * *